Figure 1:
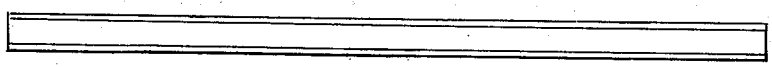

Aug. 24, 1943.                C. E. PETERS                    2,327,739
                           SELENIUM RECTIFIER
                          Filed May 14, 1942

INVENTOR.
                                                    Carl E. Peters
                                        BY          Roy M. Eilers Patented Aug. 24, 1943

2,327,739

UNITED STATES PATENT OFFICE 2,327,739

SELENIUM RECTIFIER

Carl E. Peters, St. Louis, Mo., assignor to B-L Electric Company, St. Louis, Mo., a corporation of Missouri Application May 14, 1942, Serial No. 442,984

5 Claims. (Cl. 175—366)

This invention relates to improvements in selenium rectifiers. More particularly, the invention relates to improvements in methods of making selenium rectifiers.

It is an object of the invention to provide an improved method of making selenium rectifiers.

The selenium rectifiers that are in use today, usually consist of a plurality of rectifying units that each comprises a base plate, a layer of selenium, and an electrode. The base plate in these rectifying units is usually a metal plate that has one of its surfaces arranged to receive and hold the layer of selenium. The other surface of the base plate is usually left bare so it may serve as an electrical or thermal contact. This bare surface may be placed in engagement with one of the leads that connect the rectifier with the electrical circuit, it may be placed in engagement with the electrode of an adjacent rectifying unit, or it may be placed in engagement with a heat radiating fin. Where the rectifier is to be operated at high capacity, this latter arrangement is quite often used to prevent overheating of the rectifier. In all of these cases, there is a layer of selenium on only one of the surfaces of each base plate. As a result, each rectifying unit has a limited capacity. In many cases, this limited capacity may be inadequate and a greatly increased capacity may be desired. Such increased capacity can be obtained by use of the method comprehended by the present invention. This method makes it possible to provide a layer of selenium on two of the oppositely disposed surfaces of the base plate. The provision of a layer of selenium on two of the opposed surfaces of the base plate, doubles the capacity of each rectifying unit without appreciably increasing its physical dimensions. This effects a substantial saving in materials, size, weight, and cost. It is, therefore, an object of the present invention to provide an improved method of making selenium rectifiers whereby each base plate is provided with a layer of selenium on two of its oppositely disposed surfaces.

The present day methods by which a layer of selenium is made to adhere to a base plate, are different from the improved method comprehended by the invention. These methods, as well as the method comprehended by the present invention, use heat to make the selenium adhere to the base plate, but in those methods the amount of heat is not critical. In the method comprehended by the present invention, however, the amount of heat involved is exceedingly critical. Furthermore, the present day methods do not utilize the relatively good thermal resistivity of the selenium, whereas the method comprehended by the invention must utilize it. This method employs a controlled heating of the base plate and a subsequent controlled heating of the layers of selenium. The controlled heating must heat the base plate sufficiently to permit it to melt selenium rubbed against it, but must not get the plate so hot that the selenium will be unable to solidify and will run off of the plate. This controlled heating makes it adhere to each opposed surface of a base plate. It is, therefore, an object of the present invention to provide a controlled heating method of making base plates for selenium rectifiers, whereby a layer of selenium is formed on two of the oppositely disposed surfaces of the base plates.

Other objects and advantages of the invention will become apparent to those skilled in the art from an examination of the drawing and accompanying description.

The drawing and accompanying description show a preferred form of the invention, but it is to be understood that the drawing and accompanying description do not limit the invention and the invention will be defined by the appended claims.

Figure 2:
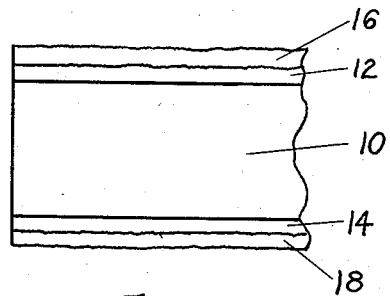

In the drawing,

Fig. 1 is an end-elevational view of a base plate made in accordance with the teachings of the invention, and Fig. 2 is an enlarged cross-sectional view of a portion of the base plate shown in Fig. 1.

Referring to the drawing in detail, a base plate is denoted by the numeral 10. On one surface thereof and in intimate engagement therewith is a thin layer of selenium 12, and on the oppositely disposed surface of the base plate and in intimate engagement therewith is a thin layer of selenium 14. A layer 16 of selenium is superimposed on layer 12 and is in intimate engagement with that layer; and a layer 18 of selenium is superimposed and in intimate engagement with layer 14.

The various layers of selenium must be applied to the base plate with great care because selenium does not adhere readily to other materials, and will only do so in a limited temperature range. As a result, a controlled heating of the base plate must be attained. This is secured by supplying a predetermined amount of heat to the base plate. This heat must make the base plate hot enough to melt a stick of selenium rubbed against first one surface and then the other, but must not be so hot that the selenium will be unable to solidify and will run off of the plate. The base plate must therefore be hot enough to melt the stick of selenium rubbed against it, but cool enough so the absorption of heat from the plate by the stick of selenium will cool the base plate sufficiently to permit the selenium to adhere to and solidify on the plate.

The amount of heat that must be stored in the base plate will depend upon a number of factors including the thermal characteristics of the material from which the base plate is made, the dimensions of the base plate, the temperature of the heater used and the length of time the plate is subjected to the heat. The evaluation of these various factors can best be made in each individual case, by the use of simple engineering calculations and experimentation in view of the principles of this invention.

In making a base plate according to the method contemplated by the present invention, the base plate is heated until it has stored up the predetermined amount of heat. It is then removed from the proximity of the heater, and a stick of selenium is rubber against first one surface of the plate and then against the other. This stick of selenium will absorb sufficient heat from the surfaces of the base plate to melt the selenium and permit it to run onto the surfaces of the plate. As stated above, the amount of heat stored up in the plate must be such that the absorption of heat from the plate by the stick of selenium is sufficient to reduce the temperature of the surface to a point below the melting point of selenium. The net result of this absorption is that the selenium will melt and run onto the surface of the base plate, where it will then solidify and adhere to the plate.

The layers that are formed in this initial step, will necessarily be quite thin because the heat in the plate must be held at a point only slightly higher than the melting point of the selenium. Because the initial layers are thin, the rectifier may need the addition of other layers of selenium to provide the desired current rectification capacity. Additional layers can be added without a complete melting of the initial layers already on the base plate, because of the relatively low thermal conductivity of selenium. The base plate with its thin layers of selenium may be subjected to heating in such a way that one of the layers of selenium is kept relatively cool and the other is quickly heated until its exposed surface is at a temperature at which selenium will melt. The base plate is then quickly moved from the proximity of the source of heat, and the stick of selenium is rubbed against the surface of the heated layer of selenium. The heat stored in this layer must be sufficient to melt the stick of selenium and cause molten selenium to flow onto the heated layer, but must be small enough that the molten selenium will promptly solidify and must be small enough that the layer itself does not melt. It is possible to raise the temperature of the exposed surface of the layer of selenium to the melting point without raising the temperature of the entire layer to that point, because the selenium is a semi-conductor, and the heat in its exposed surface will not be transmitted rapidly to the surface in contact with the base plate. Furthermore the surface in contact with the base plate will be kept cool because the base plate will rapidly conduct away any heat transmitted through the selenium to that surface. The determination of the amount of heat and time required in each case to bring the temperature of the exposed surface of the layer of selenium to the desired level, can also be determined by simple engineering calculation and experimentation. After this layer has had time to cool the base plate is turned over and the other initial layer heated and treated in similar fashion.

It is evident that the temperatures and times involved in this process are quite critical. For instance, the base plate might be heated to such a degree that the selenium from the stick would remain in the molten state and run off the plate. Such heating would be of no use at all, and as a result, a controlled heating of the base plate is necessary. The need for controlled heating is not encountered in present day methods where the plate is to be coated on one side only, because the plate can be placed in a horizontal position until the selenium has been solidified. In such a case there would be no tendency of the selenium to run off of the plate. Where, however, both sides are to be coated with a thin layer of selenium, the selenium would run off the base plate unless it solidified promptly, since both surfaces cannot be right side up at the same time.

The temperatures and times are also critical where additional layers of selenium are to be added. If the amount of heat absorbed is not carefully regulated, the entire layer of selenium will melt and run off the plate. By following the teachings of this invention, it is possible to determine by simple calculations and experiments the exact amount of heat needed for each particular case.

The layers of selenium will probably have some projections thereon that extend up beyond the level of the rest of the layer. These projections must be flattened out and forced down to the level of the rest of the layer. This is most conveniently done by subjecting the base plate to mechanical pressure, and this can be done by placing it in a press.

By use of this invention it is possible to materially increase the capacity of a rectifying unit without appreciably increasing the size thereof. In fact, the capacity may be doubled with almost no increase in size or weight.

Whereas the drawing and accompanying description have shown and described a preferred manifestation of the invention, it is obvious that various changes may be made in the expression of the invention without affecting the scope of the invention. For instance, the initial heating of the base plate may be such that only one surface is coated. Where this is the case, the other surface of the base plate may be coated in the manner employed where additional layers of selenium are added to the first layer.

What I claim is:

1. The method of forming a base plate for selenium rectifiers so it will have a layer of selenium on two of the opposed surfaces thereof, that comprises the heating of the base plate until the base plate is hot enough to melt selenium rubbed against the opposed surfaces thereof but it is cool enough so the molten selenium will adhere to and solidify on the opposed surfaces, rubbing a stick of selenium against one of the said opposed surfaces of the heated base plate to form a thin coating of selenium on that surface, subsequently rubbing said stick of selenium against the other of the opposed surfaces, and subjecting the base plate to pressure to flatten out any projections thereon.

2. The method of forming a base plate for selenium rectifiers so it will have a layer of selenium on two of the opposed surfaces thereof, that comprises the controlled heating of the base plate for a predetermined length of time until the base plate is hot enough to melt selenium rubbed against the opposed surfaces thereof but is cool enough so the molten selenium will adhere to and solidify on the said opposed surfaces, rubbing selenium against the opposed surfaces of the heated base plate to form a thin coating of selenium on each of the opposed surfaces, heating the exposed surface of one of the layers until it is hot enough to melt selenium rubbed against it but is cool enough so the temperature of the entire layer is not raised to its melting point and cool enough so the molten selenium will adhere to and solidify on the exposed surface of the said layer, rubbing the stick of selenium against the said exposed surface, heating the exposed surface of the other layer, rubbing the surface of the said other layer with the stick of selenium until some molten selenium adheres to and solidifies on the said other surface, and subjecting the base plate to pressure to flatten any projections thereon.

3. The method of forming a base plate for selenium rectifiers so it will have a layer of selenium on two of the opposed surfaces thereof, that comprises the heating of the base plate until it is hot enough to melt selenium rubbed against one surface thereof, rubbing a stick of selenium against the said surface of the heated base plate to form a thin coat of selenium thereon, heating the other surface of the base plate until it is hot enough to melt selenium rubbed against it but is cool enough so the first said layer will not melt and run off the plate and is cool enough so the molten selenium will adhere to and solidify on the exposed surface of the base plate, and rubbing the stick of selenium against the said exposed surface of the base plate.

4. The method of forming a base plate for selenium rectifiers so it will have a layer of selenium on two of the opposed surfaces thereof, that comprises the controlled heating of the base plate for a predetermined length of time until the base plate is hot enough to melt selenium rubbed against the opposed surfaces thereof but is cool enough so the molten selenium will adhere to and solidify on the said opposed surfaces, rubbing selenium against the opposed surfaces of the heated base plate to form a thin coating of selenium on each of the opposed surfaces, heating the exposed surface of one of the layers until it is hot enough to melt selenium rubbed against it but it is cool enough so the temperature of the entire layer is not raised to its melting point and cool enough so the molten selenium will adhere to and solidify on the exposed surface of the said layer, rubbing the stick of selenium against the said exposed surface, heating the exposed surface of the other layer, and rubbing the surface of the said other layer with the stick of selenium until some molten selenium adheres to and solidifies on the said other surface.

5. The method of forming a base plate for selenium rectifiers so it will have a layer of selenium on two of the opposed surfaces thereof, that comprises the controlled heating of the base plate for a predetermined length of time until the base plate is hot enough to melt selenium rubbed against the opposed surfaces thereof but is cool enough so the molten selenium will adhere to and solidify on the said opposed surfaces, and rubbing selenium against first one and then the other of the opposed surfaces of the heated base plate to form a thin coating of selenium on each of the opposed surfaces.

CARL E. PETERS.